US008632240B2

(12) United States Patent
Tang et al.

(10) Patent No.: US 8,632,240 B2
(45) Date of Patent: Jan. 21, 2014

(54) FIXED STRUCTURE OF MODULARIZED LIGHT GUIDE PLATE AND BACKLIGHT MODULE HAVING THE SAME

(75) Inventors: Guofu Tang, Shenzhen (CN); Yajun Yu, Shenzhen (CN); Yi-cheng Kuo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 198 days.

(21) Appl. No.: 13/203,836

(22) PCT Filed: Jun. 15, 2011

(86) PCT No.: PCT/CN2011/075763
§ 371 (c)(1),
(2), (4) Date: Aug. 30, 2011

(87) PCT Pub. No.: WO2012/151773
PCT Pub. Date: Nov. 15, 2012

(65) Prior Publication Data

US 2012/0287673 A1 Nov. 15, 2012

(30) Foreign Application Priority Data

May 9, 2011 (CN) .......................... 2011 2 0144584

(51) Int. Cl.
*F21V 17/10* (2006.01)
*F21V 8/00* (2006.01)

(52) U.S. Cl.
USPC ........................................... 362/634; 362/628

(58) Field of Classification Search
USPC ................................. 362/608–611, 628, 634
See application file for complete search history.

(56) References Cited

U.S. PATENT DOCUMENTS 5,211,464 A * 5/1993 Bohmer ........................ 362/634
5,815,227 A * 9/1998 Lee ................................ 349/67
7,125,152 B2 * 10/2006 Lin et al. ....................... 362/609
7,651,257 B2 * 1/2010 Shin ............................. 362/633
8,277,089 B2 * 10/2012 Park et al. .................... 362/346

FOREIGN PATENT DOCUMENTS

CN 101482240 A 7/2009
CN 101893215 A 11/2010
TW 201106839 A 2/2011

OTHER PUBLICATIONS

International Search Report of the PCT Application No. PCT/CN2011/075763.

* cited by examiner

*Primary Examiner* — Alan Cariaso

(57) ABSTRACT

The patent application relates to a fixed structure of modularized light guide plate and a backlight module, wherein the fixed structure includes a back board, a display panel, a light source, an optical module arranged between the back board and the display panel for receiving the light of the light source, and an aluminum extrusion. The aluminum extrusion is located on the upper part of the back board and is fixed on the back board. The optical module is clamped and fixed on the aluminum extrusion. By setting a clamping mechanism between the optical module and the aluminum extrusion, wherein the optical module is arranged between the back board and the display panel for receiving the light of the light source, the patent application realizes the limiting in Z-axis direction for the optical module in order to limit the movement of the optical module, prevents the optical module from being drooped and deformed due to its own weight when the liquid crystal display is inverted, and from colliding the other components in the backlight module and damaging the backlight module. Meanwhile, the ultrathin design is beneficial for guaranteeing the light incidence surface of the light source aligned with the light emission surface thereof centrally and avoiding light lose.

20 Claims, 2 Drawing Sheets

FIXED STRUCTURE OF MODULARIZED LIGHT GUIDE PLATE AND BACKLIGHT MODULE HAVING THE SAME

FIELD OF THE PATENT APPLICATION

The patent application relates to the technical field of a liquid crystal display, in particular to a fixed structure of modularized light guide plate and a backlight module having the same.

BACKGROUND OF THE PATENT APPLICATION

At present, some of the display equipments such as Liquid Crystal Display (LCD) adopt a light guide plate with modularized structure, which combines a plurality of light guide modules into a light guide plate with the method of splicing, overlapping, etc. It has the advantages that the light can be controlled, assembled and commonly used with the module as the unit.

Please take FIG. 1 as a reference. FIG. 1 is the structural schematic diagram of the backlight module with the modularized light guide plate. Such backlight module includes a back board 40, an optical film 50, a light guide plate arranged between the back board 40 and the optical film 50 and spliced by a plurality of light guide modules, a light source 30, and an aluminum extrusion 20 fixed on the back board 40. The light source 30 is arranged on the aluminum extrusion 20. The light incidence surface of the light guide module 10 faces against the light emission surface of the light source 30. The upper part of the optical film 50 is provided with a display panel 70, which is fixed by a front frame 80 and a rubber frame 90. The light guide plate includes a light guide module 10 and a light guide module 60 arranged in the left and in the right. Both the light guide module 10 and the light guide module 60 refer to a wedge-shaped side-light type structure. The light source of the light guide module 60 is located at the middle of the backlight module, and the light source of the light guide module 10 is located on the side of the backlight module. Each light guide module is fixed with the fitting of the back board by the two side end surfaces (not shown in the figure, located on the two sides vertical to the direction of the paper surface of said light guide module section shown in FIG. 1, respectively).

As for the light guide module 60 shown in circle A of FIG. 1, since it is fixed on the back board 40 of the backlight module only by two side end surfaces and the middle part of the light guide module 60 is hung in the air, therefore the light guide module 60 is easy to be deformed in the Z-axis direction when the length (vertical to the direction of the paper surface) of the light guide module 60 is larger. Especially during the process of impact test, when the display surface of the backlight module of the liquid crystal display faces downward, said light guide module 60 is likely to impact the optical film 50 and the display panel 70 to cause the slices of the display panel 70 broken since the middle part of the light guide module 60 is not effectively fixed in the Z-axis direction.

SUMMARY

The main purpose of the patent application is to provide a fixed structure of the modularized light guide plate and a backlight module, which aims to realize the limiting in Z-axis direction of the module in the backlight module and to avoid the slices of the display panel being broken during the impact test.

In order to achieve said purpose, the patent application provides a fixed structure of the modularized light guide plate, comprising a back board, a display panel, a light source, an optical module arranged between the back board and the display panel for receiving the light of the light source, and an aluminum extrusion. Said aluminum extrusion is located on the upper part of said back board and is fixed on said back board. The bottom of said optical module is provided with a protrusion. The position of said aluminum extrusion corresponding to said protrusion is provided with a groove, and said protrusion is clamped and fixed into said groove. The longitudinal section of said protrusion is a trapezoid with wide outer end and narrow inner end, the longitudinal section of said groove is a trapezoid with wide bottom and narrow opening. Said protrusion and said groove are buckled together by the method of tracking and assembling in order to clamp and fix said optical module on said aluminum extrusion.

Preferably, the inner side of said groove and/or the outer side of said protrusion is provided with a microstructure. Said microstructure includes at least one of the sawtooth, the sanding and the bulge.

Preferably, said optical module is a light mixing module, said protrusion is arranged at the bottom of said light mixing module and is extended downward. Said aluminum extrusion includes a horizontal section and a vertical section. Said groove is arranged on the upper surface of the horizontal section of said aluminum extrusion. Said light source is arranged on the vertical section of said aluminum extrusion and the light emission surface of said light source faces towards said light mixing module. Said fixed structure further includes a light guide module. Said light guide module and said light source are arranged on the two opposite sides of said light mixing module, respectively. The light incidence surface of said light guide module is arranged close to said light mixing module. The emitted light of said light source is irradiated into said light guide module via said light mixing module.

Preferably, said optical module is a wedge-shaped light guide module, said protrusion is arranged on the bottom side of one thicker end of said light guide module and is extended downward. Said aluminum extrusion includes a horizontal section and a vertical section. Said groove is arranged on the upper surface of the horizontal section of said aluminum extrusion. Said light source is arranged on the vertical section of said aluminum extrusion and the light emission surface of said light source faces towards the light incidence surface of said light guide module.

Preferably, said fixed structure further includes an optical film. Said optical film is arranged between said display panel and said back board, and it is located on the upper part of said optical module.

Preferably, said optical module is provided with two side end surfaces. The two ends of said optical module at the position of said side end faces are fixed on said back board, respectively.

Preferably, said optical module, said light source and said aluminum extrusion are provided with multiple ones. Said multiple optical modules are connected together with the method of overlapping or splicing.

Preferably, the protrusion at the bottom of said optical module and the aluminum extrusion are fixedly connected by a fixed screw or by a bolt or by gluing.

The patent application further discloses a fixed structure of modularized light guide plate, comprising a back board, a display panel, a light source, an optical module arranged between the back board and the display panel for receiving the light of said light source, and an aluminum extrusion. Said aluminum extrusion is located on the upper part of the back board and is fixed on said back board. Said optical module is clamped and fixed on said aluminum extrusion.

Preferably, the bottom part of said optical module is provided with an obliquely-arranged protrusion. An obliquely-arranged groove is arranged on a part of said aluminum extrusion corresponding to said protrusion. Said protrusion is clamped and fixed into said groove.

Preferably, said protrusion is arranged in the direction of the vertical curve of the gravity centre of said optical module.

Preferably, the inner side of said groove and/or the outer side of said protrusion is provided with a microstructure. Said microstructure includes at least one of the sawtooth, the sanding and the bulge.

Preferably, said optical module is a light mixing module, said protrusion is arranged at the bottom of said light mixing module and is extended downward. Said aluminum extrusion includes a horizontal section and a vertical section. Said groove is arranged on the upper surface of the horizontal section of said aluminum extrusion. Said light source is arranged on the vertical section of said aluminum extrusion and the light emission surface of said light source faces towards said light mixing module. Said fixed structure further includes a light guide module. Said light guide module and said light source are arranged on the two opposite sides of said light mixing module, respectively. The light incidence surface of said light guide module is arranged close to said light mixing module. The emitted light of said light source is irradiated into said light guide module via said light mixing module.

Preferably, the section shape of said light mixing module is at least one of the square or the trapezoid.

Preferably, said optical module is a wedge-shaped light guide module, said protrusion is arranged on the bottom side of one thicker end of said light guide module and is extended downward. Said aluminum extrusion includes a horizontal section and a vertical section. Said groove is arranged on the upper surface of the horizontal section of said aluminum extrusion. Said light source is arranged on the vertical section of said aluminum extrusion and the light emission surface of said light source faces towards the light incidence surface of said light guide module.

Preferably, said fixed structure further includes an optical film. Said optical film is arranged between said display panel and said back board, and it is located on the upper part of said optical module.

Preferably, said optical module is provided with two side end faces. The two ends of said optical module at the position of said side end surfaces are fixed on said back board, respectively.

Preferably, said optical module, said light source and said aluminum extrusion are provided with multiple ones. Multiple said optical modules are connected together with the method of overlapping or splicing.

Preferably, the protrusion at the bottom of said optical module and the aluminum extrusion are fixedly connected by a fixed screw or by a bolt or by gluing.

The patent application further provides a backlight module with a modularized light guide plate, comprising a fixed structure of the modularized light guide plate. Said fixed structure includes a back board, a display panel, a light source, an optical module arranged between the back board and the display panel for receiving the light of said light source, and an aluminum extrusion. Said aluminum extrusion is located on the upper part of the back board and is fixed on said back board. Said optical module is clamped and fixed on said aluminum extrusion.

The patent application provides a fixed structure of the modularized light guide plate and a backlight module. By setting a clamping mechanism between an optical module and an aluminum extrusion, wherein the optical module is arranged between the back board and the display panel for receiving the light of the light source, i.e. setting a protrusion at the bottom of the optical module and setting a groove on the corresponding position of the upper surface of the aluminum extrusion, the protrusion and the groove is buckled to realize the Z-axis limiting for the optical module so as to limit the optical module moving in the Z-axis direction, and to prevent the optical module from being drooped and deformed due to its own weight when the liquid crystal display is inverted (the display panel faces downward), and from colliding the other components in the backlight module and damaging the backlight module. Meanwhile, the ultrathin design is beneficial for guaranteeing the light incidence surface of the optical module aligned with the light emission surface of the light source centrally and avoiding light lose.

DESCRIPTION OF ATTACHED DRAWINGS

The purpose implementation, the function features and advantages of the patent application will be further illustrated by integrating the exemplary embodiments and taking the attached drawings as references.

DETAILED DESCRIPTION OF THE EMBODIMENTS

The general concept of the technical method of the patent application is to install a corresponding clamping mechanism between the optical module of the backlight module and the aluminum extrusion for fixing the light source in order to enable the optical module and the aluminum extrusion to be mutually clamped and fixed so as to limit the optical module moving in Z-axis direction and avoid the optical module being deform and being collided with the optical film, the display panel and etc. so as not to cause the damage of the backlight module.

The technical solution for realizing the patent application purpose will be exactly illustrated by integrating the attached drawings and the exemplary embodiments. It should be understood that the described exemplary embodiment is only used for illustrating this patent application rather than limiting this patent application.

Figure 1:
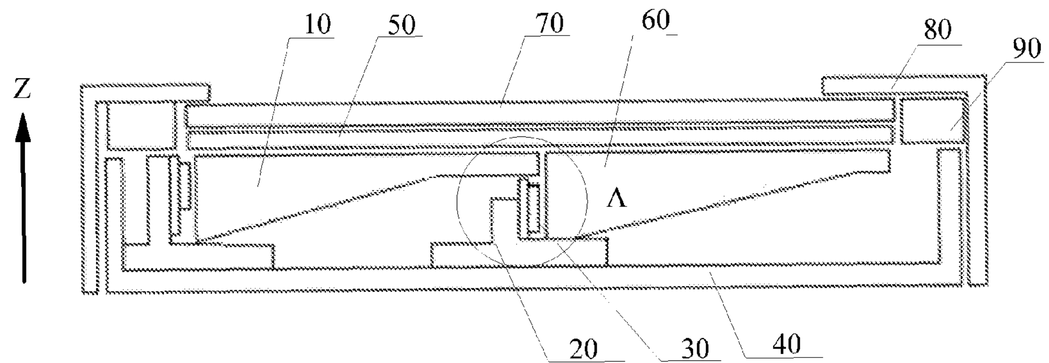
FIG. 1 is the schematic diagram of the section of the present backlight module.
Figure 2:
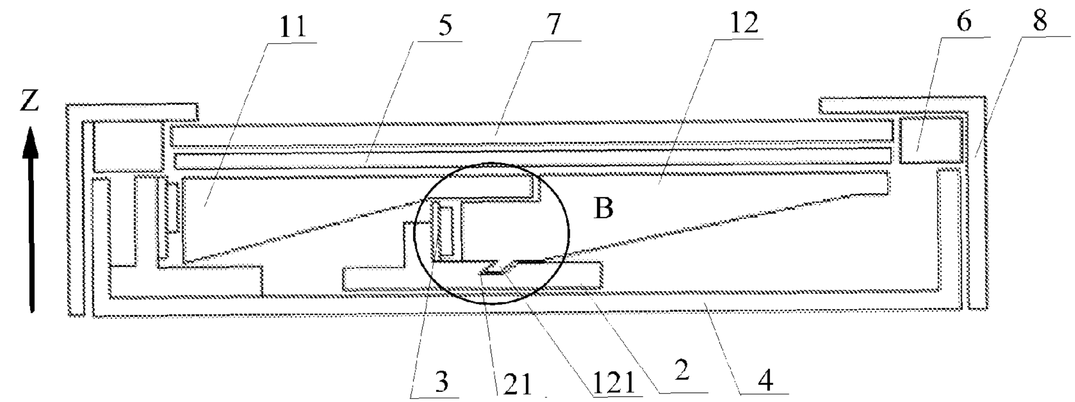
FIG. 2 is the cutaway view of the section in the first exemplary embodiment of the backlight module with the modularized light guide plate according to the patent application.

Take FIG. 2 as a reference. FIG. 2 is the cutaway view of the section in the first exemplary embodiment of the backlight module with the modularized light guide plate according to the patent application. Such backlight module includes a back board 4, an optical film 5, a light guide plate located between the back board 4 and the optical film 5 and constituted by a plurality of light guide modules, a light source 3, and an aluminum extrusion fixed on the back board 4. The upper part of the optical film 5 is provided with a liquid crystal panel 7 and is supported and fixed by a rubber frame 6 and an iron front frame 8.

As is shown in FIG. 2, the light guide plate of this exemplary embodiment includes a first light guide module 11 and a second light guide module 12, also respectively known as a first optical module and a second optical module, joined with each other. Both the first light guide module 11 and the second light guide module 12 are wedged-shaped side-incidence light guide modules. The left end of the second light guide module 12 is provided with a step part, and the right end of the first light guide module 11 is overlapped on said step part of the second light guide module 12. Said light guide modules are respectively provided with a left end surface, a right end surface relatively arranged with the left end surface, a top surface, a bottom surface relatively and obliquely arranged with the left end surface, and two side end surfaces in parallel with the section of the light guide module. The left end surface is the light incidence surface of the light guide module, and the top surface is the light emission surface of the light guide module. The right end surface, the bottom surface and the two side end surfaces are taken as the light reflection surface. The position of the back board 4 corresponding to the two side end surfaces is provided with a locating column or a groove and other fixed structures. These fixed structures are used for locating and fixing the first light guide module 11 and the second light guide module 12, respectively.

The lower left parts of the first light guide module 11 and the second light guide module 12 are respectively provided with an aluminum extrusion 2. The aluminum extrusion 2 is extended vertical to the direction of the paper surface. As is shown in FIG. 2, the section of the aluminum extrusion is approximately L-shaped, including a horizontal section and a vertical section that are mutually vertical to each other. The horizontal section of the aluminum extrusion 2 is fixed on the back board 4, and the vertical section of the aluminum extrusion 2 is extended from the left end of the horizontal section to the display panel 7. The light source 3 is arranged on the vertical section of the aluminum extrusion 2, and the light emission surface of the light source 3 is adjacently arranged with the light incidence surface of the light guide module so that the light emitted from the light source 3 can be irradiated to the inside of the light guide module via the light incidence surface of the light guide module. Further, said aluminum extrusion 2 can be provided with multiple ones, which are arranged into a line at intervals and are extended vertical to the direction of the paper surface.

In this exemplary embodiment, the light incidence surface of the second light guide module 12 is arranged on the left end. The left end part of said second light guide module 12 is a thicker part in the whole wedge-shaped structure and is also the gravity part of the whole light guide module. The bottom of such left end part of the second light guide module 12, that is, the bottom of such left end part of the second optical module is provided with a protrusion 121. The upper surface of the horizontal section of the corresponding aluminum extrusion 2 is provided with a groove 21. Said protrusion 121 and said groove 21 are mutually buckled and connected in order to limit the second light guide module 12 moving in the Z-axis direction.

In the exemplary embodiment, buckling connection method for the protrusion 121 and the groove 21 is an oblique assembling method. Specifically, the groove 21 is obliquely arranged (the extending direction of the groove 21 and the direction of the Z-axis forms a certain angle), which is provided with two mutually-paralleled and relatively-arranged inner sides extended along the direction vertical to the paper surface. The protrusion 121 is also obliquely arranged, and the structure of the protrusion 121 matches with that of said groove 21, and it is provided with two mutually-paralleled and relatively-arranged outer sides extended along the direction vertical to the paper surface. The two inner sides of said groove 21 are respectively contacted with the two outer sides of the protrusion 121 so that the protrusion 121 is buckled with the groove 21 with the method of oblique assembling. When the display panel 7 is left facedown, since the inner side of the groove 21 and the outer side of the protrusion 121 are stressed under the static friction, thus the bottom surface of the light guide module 12 can be further clamped and fixed into the groove 21 of the aluminum extrusion 2 by the protrusion 121, besides that the second light guide module 12 can be fixed on the back board by the two side end surfaces. Therefore, the second light guide module 12 can be effectively fixed in Z-axis direction. Although the second light guide module 12 has longer length (vertical to the direction of the paper surface) and larger weight, the light guide module 12 is not easily deformed in Z-axis direction. Preferably, the protrusion 121 can preferably arranged in the direction of the vertical curve of the gravity centre of the second light guide module 12. When the display panel of the backlight module for the liquid crystal display faces downward, since the second light guide module 12 is better fixed in Z-axis direction, thus the second light guide module 12 does not collide other light guide modules, the optical film 50 or the display panel 7 due to the deformation so as to avoid the damage of the backlight module.

In order to further enhance the static friction, a microstructure (not shown in the figure) can be arranged on the inner side of said groove 21 and/or the outer side of the said protrusion 121. Said microstructure can be a sawtooth, a sanding or a bulge.

When installing, firstly fixes the light source 3 on the aluminum extrusion 2, then fixes the aluminum extrusion 2 on the back board 4, and then buckles the second light guide module 12 on the aluminum extrusion 2 with the method of oblique assembling or drawing assembling, then installs the first light guide module 11, and after that places the optical film 5 on the upper part of the second light guide module 12 and locates it with the rubber frame 6, and then places the display panel 7 on the upper part of the optical film 5, and finally places the iron front frame 8 to fix the display panel 7. The optical film 5 in this exemplary embodiment can be a diffusion plate, a brightening piece or a compensating piece.

Compared with the existing technology, the exemplary embodiment installs a clamping structure between the second light guide module 12 and the aluminum extrusion 2. By the buckling connection between the protrusion 121 and the groove 21, it can enhance the limiting in Z-axis direction of the second light guide module 12, limit the movement of the second light guide module 12 and prevent the second light guide module 12 from being drooped and deformed due to its own weight to impact the other components in the backlight module when the liquid crystal display is being inverted (the display panel faces downward). Meanwhile, under the ultrathin design, the exemplary embodiment is beneficial for guaranteeing the light incidence surface of the second light guide module 12 aligned with the light emission surface of the light source 3 centrally and avoiding light lose.

In said first exemplary embodiment, the protrusion 121 is arranged on the second light guide module 12, and the groove 21 is arranged on the aluminum extrusion 2. However, in other exemplary embodiments, the positions of the groove 21 and the protrusion 121 are changeable, i.e. the groove 21 is arranged on the second light guide module 12 and the protrusion 121 is arranged on the aluminum extrusion 2, both ones are mutually clamped to realize the purpose of the patent application as well. Additionally, in other exemplary embodiments, a similar structure can be arranged between the first light guide module 11 of the backlight module or other light guide modules and the corresponding aluminum extrusion 2. Therefore, it is not only limited in the second light guide module 12.

Figure 3:
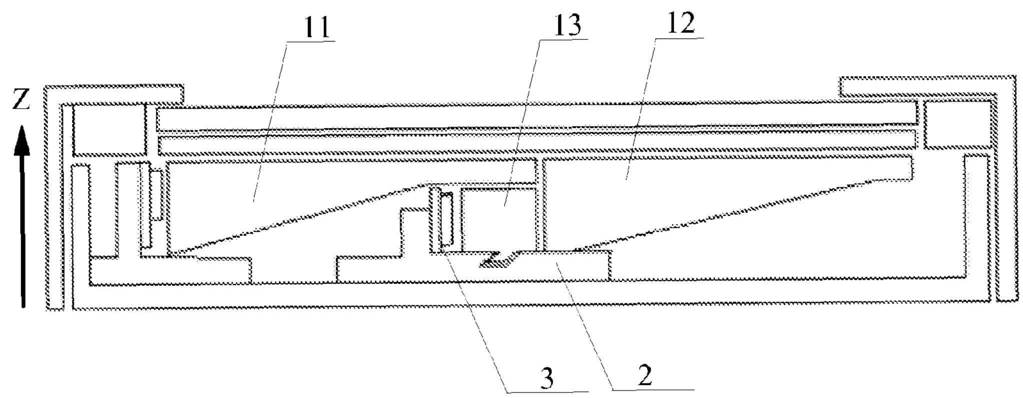
FIG. 3 is the cutaway view of the section in the second exemplary embodiment of the backlight module with the modularized light guide plate according to the patent application.

Take FIG. 3 as a reference. FIG. 3 is the second exemplary embodiment of the backlight module with the modularized light guide plate according to the patent application. The backlight module with modularized light guide plate is similar with that of said first exemplary embodiment, but they have the following differences: arranging the first light guide module 11 and the second light guide module 12 with the method of splicing rather than overlapping; and separating a single light mixing module 13 from one section of the left end of the second light guide module 12 originally located at the step part. As is shown in FIG. 3, said light mixing module 13 is arranged between said second light guide module 12 and the light source 3 thereof for increasing the light mixing distance of the light source 3. The light of the light source 3 firstly passes through the light mixing module 13 and then enters the second light guide module 12 in order to avoid the phenomenon of unequal brightness and darkness in the visible range due to the insufficient light mixing distance. The light mixing module 13 is further fixed on the aluminum extrusion 2 by using a similar clamping structure between the second light guide module 12 and the aluminum extrusion 2 in the first exemplary embodiment. That is to say, the limiting in Z-axis direction for the light mixing module 13 under the situation of side-edge horizontal location is realized by obliquely assembling and buckling the protrusion on the bottom surface of the light mixing module 13 and the groove on the upper surface of the horizontal section of the aluminum extrusion 2.

The added light mixing module 13 can either be trimmed from the flat board or be molded. In this exemplary embodiment, the section shape of the light mixing module 13 is a square. However, the section is not limited in this and it can be a trapezoid as well. The material of the light mixing module 13 is selected from the high polymer material with high light transmission, such as PMMA (polymethyl methacrylate), PC (polycarbonate) and so on. Since the light mixing module 13 adds the light mixing distance of the LED (light emission diode), thus the phenomenon of unequal brightness and darkness cannot be seen in the visible range.

The mounting structures of the second light guide module 12 or the light mixing module 13 and the aluminum extrusion 2 in said exemplary embodiment constitute the fixed structure of the modularized light guide plate in the exemplary embodiment. Additionally, in the exemplary embodiment, a clamping structure similar with that of the first exemplary embodiment can be further arranged between the second light guide module 12 and the aluminum extrusion 2, and it has same effect with that of the first exemplary embodiment. Here will not illustrate more details.

Figure 4:
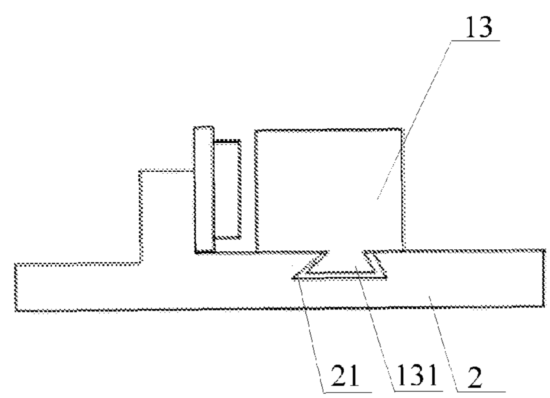
FIG. 4 is the cutaway view of the section of the fixed structure of the modularized light guide plate in the third exemplary for the backlight module with the modularized light guide plate according to the patent application.

Take FIG. 4 as a reference. FIG. 4 is the cutaway view of the section of the fixed structure of the modularized light guide plate in the third exemplary for the backlight module with the modularized light guide plate according to the patent application. The fixed structure of the modularized light guide plate is similar with that of said second exemplary embodiment, but they have the following differences: the buckling connection way for the protrusion 131 of the light mixing module 13 and the groove 21 of the aluminum extrusion 2 in this exemplary embodiment is the drawing assembling. Specifically, the longitudinal section of said protrusion 131 is a trapezoid with outer end wide and inner end narrow, the longitudinal section of said groove 21 is a trapezoid with bottom end wide and opening narrow, so that the protrusion 131 is buckled with the groove 21 with the method of drawing assembling. In the process of mounting, inserting the protrusion 131 of the light mixing module 13 into the groove 21 of the aluminum extrusion 2 from the side of the aluminum extrusion 2, as a result, the light mixing module 13 can be more firmly fixed with the aluminum extrusion 2. The other structures of the exemplary embodiment are same as those of the second exemplary embodiment.

Figure 5:
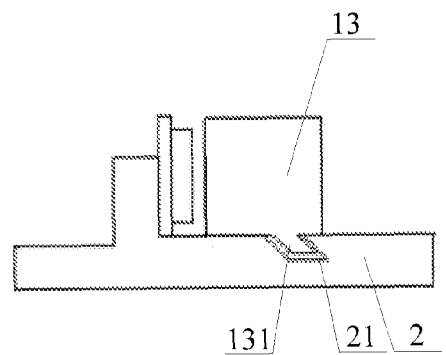
FIG. 5 is the cutaway view of the section of the fixed structure of the modularized light guide plate in the fourth exemplary for the backlight module with the modularized light guide plate according to the patent application.

Take FIG. 5 as a reference. FIG. 5 is the cutaway view of the section of the fixed structure of the modularized light guide plate in the fourth exemplary for the backlight module with the modularized light guide plate according to the patent application. The fixed structure of this modularized light guide plate is similar with that of the second exemplary embodiment, but they have the following differences: the oblique directions for the protrusion 131 of the light mixing module 13 and the groove 21 of the aluminum extrusion 2 in this exemplary embodiment and the oblique directions of the protrusion 131 and the groove 21 in the second exemplary embodiment are reversed. The other structures of this exemplary embodiment are same as those of the second exemplary embodiment.

Certainly, the patent application can adopt other existing exemplary embodiments having the same effects as said respective exemplary embodiment. For examples, using the fixed screws or the bolts to fixedly connect the second light guide module 12 or the protrusion at the bottom of the light mixing module 13 with the aluminum extrusion; or adopting the gluing method by the glue water to limit the second light guide module 12 or the light mixing module 13 moving in Z-axis direction and prevent the second light guide module 12 or the light mixing module 13 from being drooped and deformed to cause the display panel 7 broken when the liquid crystal display is being inverted. Meanwhile, the ultrathin design is beneficial for guaranteeing the light incidence surface of respective module aligned with the light emission surface of the light source centrally so as to avoid the light lose.

It needs to be illustrated that although respective said exemplary embodiment is described only by taking the second light guide module 12 or the light mixing module 13 as the examples, however, the other optical modules that are located between the back board 4 and the optical film 5 and are similar with the second light guide module 12 or the light mixing module 13 can be all fixed by similar clamping structures. Here will not illustrate more details.

The fixed structure of the modularized light guide plate and the backlight module of the exemplary embodiment of the patent application, wherein a protrusion 121 is arranged at the bottom of the second light guide film 12 or the light mixing module 13, and a groove 21 is arranged on the corresponding position of the upper surface of the aluminum extrusion 2. Thereby, the protrusion 121 and the groove 21 is buckled together in order to realize the Z-axis limiting for the relative modules so as to limit the module moving in the Z-axis direction, to prevent the module from being drooped and deformed while the liquid crystal display is being inverted and to avoid the slices of the display panel being broken. Meanwhile, the ultrathin design is beneficial for guaranteeing the light incidence surface aligned with the light emission surface centrally and avoiding light lose.

What is illustrated above is just a preferable exemplary embodiment, which will not limit the patent scope of the patent application. Any equivalent structures or flow replacements made by the specifications and drawings of the patent application, which are directly or indirectly applied to other technical fields, should be included into the protection scope of the patent application.

What is claimed is:

1. A fixed structure of modularized light guide plate, comprising a back board, a display panel, a light source, an optical module arranged between the back board and the display panel for receiving the light of the light source, and an aluminum extrusion, said aluminum extrusion is located on the upper part of said back board and is fixed on said back board, wherein the bottom of said optical module is provided with a protrusion; the position of said aluminum extrusion corresponding to said protrusion is provided with a groove, and said protrusion is clamped and fixed into said groove; the longitudinal section of said protrusion is a trapezoid with wide outer end and narrow inner end, the longitudinal section of said groove is a trapezoid with wide bottom and narrow opening; said protrusion and said groove are buckled together by the method of tracking and assembling in order to clamp and fix said optical module on said aluminum extrusion; said optical module is provided with two side end surfaces; the two ends of said optical module at the position of said side end surfaces are fixed on said back board, respectively.

2. The fixed structure according to claim 1, wherein the inner side of said groove and/or the outer side of said protrusion is provided with a microstructure, and said microstructure comprises at least one of the sawtooth, the sanding and the bulge.

3. The fixed structure according to claim 2, wherein said optical module is a light mixing module, said protrusion is arranged at the bottom of said light mixing module and is extended downward; said aluminum extrusion comprises a horizontal section and a vertical section; said groove is arranged on the upper surface of the horizontal section of said aluminum extrusion; said light source is arranged on the vertical section of said aluminum extrusion and the light emission surface of said light source faces towards said light mixing module; said fixed structure further comprises a light guide module; said light guide module and said light source are arranged on the two opposite sides of said light mixing module, respectively; the light incidence surface of said light guide module is arranged close to said light mixing module; the emitted light of said light source is irradiated into said light guide module via said light mixing module.

4. The fixed structure according to claim 2, wherein said optical module is a wedge-shaped light guide module, said protrusion is arranged on the bottom side of one thicker end of said light guide module and is extended downward; said aluminum extrusion comprises a horizontal section and a vertical section; said groove is arranged on the upper surface of the horizontal section of said aluminum extrusion; said light source is arranged on the vertical section of said aluminum extrusion and the light emission surface of said light source faces towards the light incidence surface of said light guide module.

5. The fixed structure according to claim 1, wherein said fixed structure further comprises an optical film; said optical film is arranged between said display panel and said back board and is located on the upper part of said optical module.

6. The fixed structure according to claim 1, wherein said optical module, said light source and said aluminum extrusion are provided with multiple ones; said multiple optical modules are connected together with the method of overlapping or splicing.

7. The fixed structure according to claim 1, wherein the protrusion at the bottom of said optical module and the aluminum extrusion are fixedly connected by a fixed screw or by a bolt or by gluing.

8. A fixed structure of modularized light guide plate, comprising a back board, a display panel, a light source, an optical module arranged between the back board and the display panel for receiving the light of said light source, and an aluminum extrusion, wherein said aluminum extrusion is located on the upper part of the back board and is fixed on said back board; said optical module is clamped and fixed on said aluminum extrusion; one of the bottom part of said optical module and said aluminum extrusion is provided with an obliquely-arranged protrusion, and the other is provided with an obliquely-arranged groove corresponding to said protrusion, and said protrusion is clamped and fixed into said groove.

9. The fixed structure according to claim 8, wherein said protrusion is arranged in the direction of the vertical curve of the gravity centre of said optical module.

10. The fixed structure according to claim 8, wherein the inner side of said groove and/or the outer side of said protrusion is provided with a microstructure; said microstructure comprises at least one of the sawtooth, the sanding and the bulge.

11. The fixed structure according to claim 10, wherein said optical module is a light mixing module; said protrusion is arranged at the bottom of said light mixing module and is extended downward; said aluminum extrusion comprises a horizontal section and a vertical section; said groove is arranged on the upper surface of the horizontal section of said aluminum extrusion; said light source is arranged on the vertical section of said aluminum extrusion and the light emission surface of said light source faces towards said light mixing module; said fixed structure further comprises a light guide module, and said light guide module and said light source are separately arranged on the two opposite sides of said light mixing module; the light incidence surface of said light guide module is arranged close to said light mixing module; the emitted light of said light source is irradiated into said light guide module via said light mixing module.

12. The fixed structure according to claim 11, wherein the section shape of said light mixing module is at least one of the square or the trapezoid.

13. The fixed structure according to claim 10, wherein said optical module is a wedge-shaped light guide module, said protrusion is arranged on the bottom side of one thicker end of said light guide module and is extended downward; said aluminum extrusion comprises a horizontal section and a vertical section; said groove is arranged on the upper surface of the horizontal section of said aluminum extrusion; said light source is arranged on the vertical section of said aluminum extrusion and the light emission surface of said light source faces towards the light incidence surface of said light guide module.

14. The fixed structure according to claim 8, wherein said fixed structure further comprises an optical film, said optical film is arranged between said display panel and said back board and is located on the upper part of said optical module.

15. The fixed structure according to claim 8, wherein said optical module is provided with two side end surfaces, the two ends of said optical module at the position of said side end surfaces are separately fixed on said back board.

16. The fixed structure according to claim 8, wherein said optical module, said light source and said aluminum extrusion are provided with multiple ones, and said multiple optical modules are connected together with the method of overlapping or splicing.

17. The fixed structure according to claim 8, wherein the protrusion at the bottom of said optical module and the aluminum extrusion are fixedly connected by a fixed screw or by a bolt or by gluing.

18. A backlight module with a modularized light guide plate, wherein comprises a fixed structure of the modularized light guide plate, and said fixed structure comprises a back board, a display panel, a light source, an optical module arranged between the back board and the display panel for receiving the light of said light source, and an aluminum extrusion; said aluminum extrusion is located on the upper part of the back board and is fixed on said back board; said optical module is clamped and fixed on said aluminum extrusion; one of the bottom part of said optical module and said aluminum extrusion is provided with an obliquely-arranged protrusion, and the other is provided with an obliquely-arranged groove corresponding to said protrusion, and said protrusion is clamped and fixed into said groove.

19. The fixed structure according to claim 18, wherein the inner side of said groove and/or the outer side of said protrusion is provided with a microstructure; said microstructure comprises at least one of the sawtooth, the sanding and the bulge; said optical module is a light mixing module; said protrusion is arranged at the bottom of said light mixing module and is extended downward; said aluminum extrusion comprises a horizontal section and a vertical section; said groove is arranged on the upper surface of the horizontal section of said aluminum extrusion; said light source is arranged on the vertical section of said aluminum extrusion and the light emission surface of said light source faces towards said light mixing module; said fixed structure further comprises a light guide module, and said light guide module and said light source are separately arranged on the two opposite sides of said light mixing module; the light incidence surface of said light guide module is arranged close to said light mixing module; the emitted light of said light source is irradiated into said light guide module via said light mixing module.

20. The backlight module according to claim 18, wherein the inner side of said groove and/or the outer side of said protrusion is provided with a microstructure; said microstructure comprises at least one of the sawtooth, the sanding and the bulge; said optical module is a wedge-shaped light guide module, said protrusion is arranged on the bottom side of one thicker end of said light guide module and is extended downward; said aluminum extrusion comprises a horizontal section and a vertical section; said groove is arranged on the upper surface of the horizontal section of said aluminum extrusion; said light source is arranged on the vertical section of said aluminum extrusion and the light emission surface of said light source faces towards the light incidence surface of said light guide module.

* * * * *